United States Patent
Vehkalahti

(10) Patent No.: US 7,844,046 B2
(45) Date of Patent: Nov. 30, 2010

(54) METHOD FOR GENERATING A TELEPHONE NUMBER

(75) Inventor: Jani Vehkalahti, Oulu (FI)

(73) Assignee: Nokia Corporation, Espoo (FI)

( * ) Notice: Subject to any disclaimer, the term of this patent is extended or adjusted under 35 U.S.C. 154(b) by 1345 days.

(21) Appl. No.: 10/977,554

(22) Filed: Oct. 28, 2004

(65) Prior Publication Data

US 2005/0117736 A1    Jun. 2, 2005

(30) Foreign Application Priority Data

Oct. 28, 2003    (FI)    ................................. 20035190

(51) Int. Cl.
*H04M 1/00* (2006.01)
*H04M 3/00* (2006.01)

(52) U.S. Cl. ............................. 379/355.07; 379/355.03

(58) Field of Classification Search ............ 379/355.02, 379/355.03, 355.07
See application file for complete search history.

(56) References Cited

U.S. PATENT DOCUMENTS

| | | | |
|---|---|---|---|
| 5,034,916 A | 7/1991 | Ordish | 364/900 |
| 6,049,796 A | 4/2000 | Siitonen et al. | 707/3 |
| 7,136,880 B2 * | 11/2006 | Wilkins et al. | 1/1 |
| 2004/0001481 A1 * | 1/2004 | Kamenetsky et al. | 370/353 |
| 2007/0117546 A1 * | 5/2007 | Doulton | 455/413 |

FOREIGN PATENT DOCUMENTS

| | | |
|---|---|---|
| EP | 0458563 A2 | 11/1991 |
| EP | 0917038 A2 | 5/1999 |
| GB | 2351578 | 1/2001 |

* cited by examiner

*Primary Examiner*—Alexander Jamal
(74) *Attorney, Agent, or Firm*—Ware, Fressola, Van Der Sluys & Adolphson LLP

(57) ABSTRACT

Method for generating a telephone number in a device comprising at least a display for presenting a first character string. At least one second character string (1) containing a telephone number is selected from the first character string presented on the display, and a telephone number (2), which is signalled is searched for from said character string. The invention also relates to a device, a computer program and a software product implementing the method.

13 Claims, 2 Drawing Sheets

METHOD FOR GENERATING A TELEPHONE NUMBER

CROSS-REFERENCE TO RELATED APPLICATIONS

This application claims priority under 35 USC §119 to Finnish Patent Application No. 20035190 filed on Oct. 28, 2003.

FIELD OF THE INVENTION

The invention relates to a method for generating a telephone number. The invention also relates to a device implementing the method. The invention also relates to a computer program implementing the method, as well as to a software product containing said computer program.

BACKGROUND OF THE INVENTION

In different kinds of telephones and mobile stations a telephone number is typically utilized to identify the subscriber connection. When a telephone number is entered in the device the communication system is given the address to which one wishes to set up a communication link. Typically the communication link is a telephone call, a telecopy transmission and/or a text message (SMS, short message service), or other kind of message. Hereinbelow, the term call will be used for all possible communication links.

Many communication devices, such as for example telephones, and especially mobile stations comprise other properties and applications in addition to the applications relating to call management. Telephone numbers exist in various forms in several kinds of documents, files and applications. Typical applications that contain telephone numbers include different kinds of calendars, notebooks, telephone memos and archives. Conventionally telephone numbers have been transferred from such an application to a call application by copying them manually.

Various kinds of attempts have been made to solve said drawback that requires manual work and also includes the risk of misrepresented information. One way has been to form the telephone memos and corresponding applications as such so that information entered in a determined field has been interpreted as a telephone number. This information can thus be transferred by means of a program to a telephone application to be used for example for a call. The solution implemented in said manner has, however, prevented efficient utilization of the information because it has been possible for the users to enter in the field of the application intended for the telephone number only numbers and certain symbols accepted in the application that have a certain meaning, such as for example #, *, (,) and /.

SUMMARY OF THE INVENTION

The main purpose of the present invention is to disclose a user interface that enables the transfer of a telephone number from one application to another.

To attain this purpose, the method according to the invention is for generating a telephone number in a device comprising at least a display for presenting a first character string, wherein at least one second character string containing a telephone number is selected from the first character string presented on the display, a telephone number is searched for from the second character string, and the searched telephone number is signalled.

The device implementing the invention, comprises at least means for generating a telephone number and a display for presenting at least a first character string, wherein the device further comprises at least means for selecting a second character string containing at least one telephone number from the first character string presented on the display, means for searching for a telephone number from the second character string and means for signalling the searched telephone number.

The computer program implementing the method is for generating a telephone number from a character string presented on a display, wherein the program includes at least commands for selecting a second character string containing at least one phone number from a first character string presented on the display, for searching for a phone number from the second character string, and for signalling the searched telephone number.

The software product that comprises at least a computer program for generating a telephone number from a character string present on a display, wherein the program comprises at least commands for selecting a second character string containing at least one phone number from the first character string presented on the display, for searching for a phone number from the second character string, and for signalling the searched telephone number. Further embodiments of these attainments are described in detail below.

One of the main ideas of the invention is that in addition to a number the user can also enter other kind of text in the field intended for the telephone number, and the device will automatically search for the telephone number and/or numbers among the text. The user enters the text containing the telephone number in a suitable manner in the field reserved for this purpose. The entering of the information can take place in various ways, for example by typing, transferring files, or in a preferred embodiment by means of a "cut and paste" function. In the cut and paste technique the data content of an application is selected (for example by highlighting it) and the selected information is transferred to the telephone number application. The telephone number application scans through the information to find the telephone number.

The found telephone number can be used in several different ways. In an embodiment of the invention a connection is set up to said telephone number. In a second embodiment, the found telephone number is stored in the database advantageously with other identification data. In a preferred embodiment the identification data, such as for example a name is composed automatically of the information contained in the scanned text.

In an embodiment, in turn, the text located close to the numerical data is identified, and this data is utilized when determining the more specific type of the telephone number, such as for example whether the number in question is a telephone number, a telecopy number or a mobile phone number. On the basis of said data it is possible to use the correct number for the message to be transmitted.

One embodiment of the invention can be used when setting up a so-called group call. Thus, a so-called conference call is set up to the numbers scanned out of the text, or another group message (for example a telecopy message or text message) can be transmitted. In a preferred embodiment the numbers are first shown to the user that acknowledges and/or rejects the desired numbers before transmitting the message. It is also possible to store said group in the system.

The invention facilitates the use of the device, because the user does not have to be especially careful for example when copying a telephone number from another application, or it is not necessary for the user to search for the number for example from a document, but the search can be left to the device.

An embodiment of the invention is advantageous, for example, in mobile station use because the user can perform the selection rapidly in a "rough" fashion i.e. it is not necessary to select (highlight) the data precisely, but in order to find the number, it is sufficient that the telephone number is located somewhere in the highlighted information. This property is especially advantageous when the operating environment of the device is not optimal, for example because of movement, lighting, the size of the device and/or the design of the device.

An embodiment of the invention also reduces the risk of entering an erroneous number, as the copying of the file or the text part that with certainty contains the telephone number ensures that nothing is accidentally left out from the telephone number, and nothing extra is added thereto. Naturally, the desired connection cannot be set up with an inaccurate number.

The invention is advantageous in such communication devices that also utilize other applications besides a telephone number application, such as for example a calendar, a notebook and/or e-mail. Such devices include for example various smart phones and other multi-functional mobile stations. The invention can also be applied in such devices that do not include said applications utilizing information containing telephone numbers.

DESCRIPTION OF THE DRAWINGS

In the following, the invention will be described in more detail with reference to the appended principle drawings, in which.

DETAILED DESCRIPTION OF THE INVENTION

For the sake of clarity, the Figures only show the details necessary for understanding the invention. The structures and details which are insignificant in view of understanding the invention but which are evident for anyone skilled in the art have been omitted from the Figures in order to emphasize the characteristics of the invention.

One of the main ideas of the invention is that the user can enter a text 1 in a field 5 intended for a telephone number in a telephone number application 4, said text containing possibly also other information besides the telephone number 2, and the device is capable of searching for the telephone number and/or numbers from the text automatically. The user enters the text 1 containing the telephone number 2 in a suitable manner in the field 5 of the telephone number application 4 reserved for this purpose. The entering of the text 1 can take place in various ways, for example by typing, transferring files, or by means of the cut and paste function via a clipboard.

Figure 1:
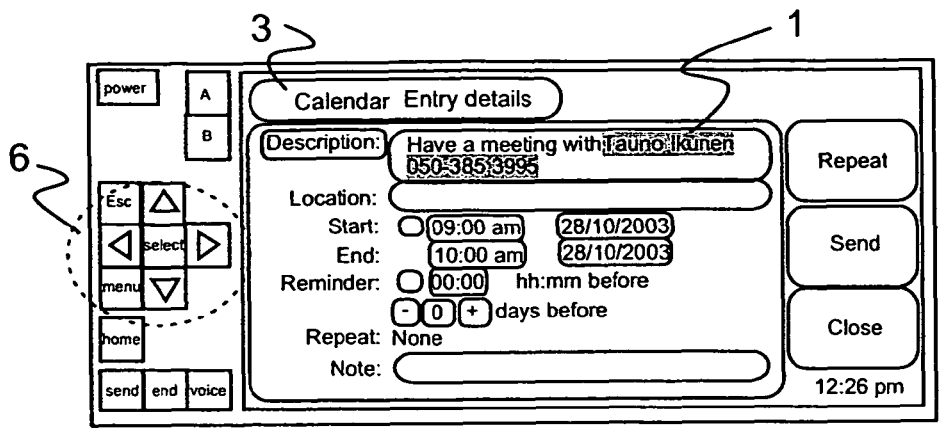
FIG. 1 shows a view of a calendar application of the invention.
Figure 2:
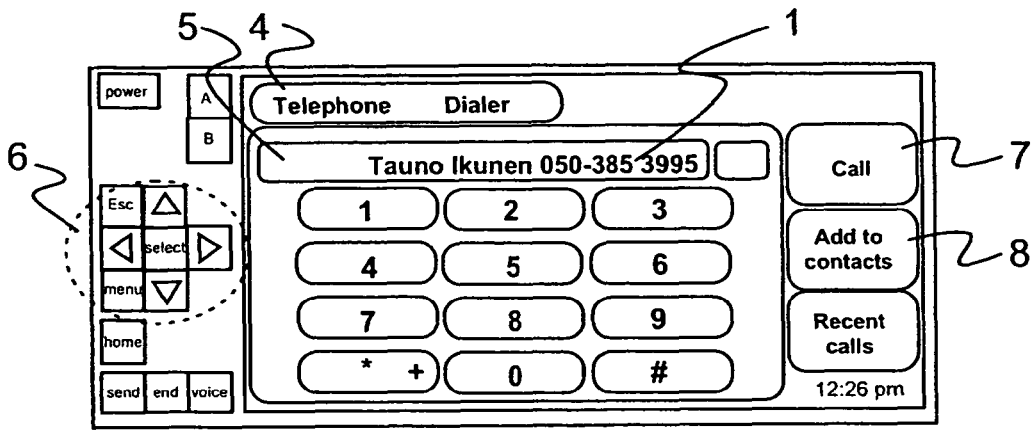
FIG. 2 shows an embodiment of a telephone number application when a text containing a telephone number has been introduced therein.
Figure 3:
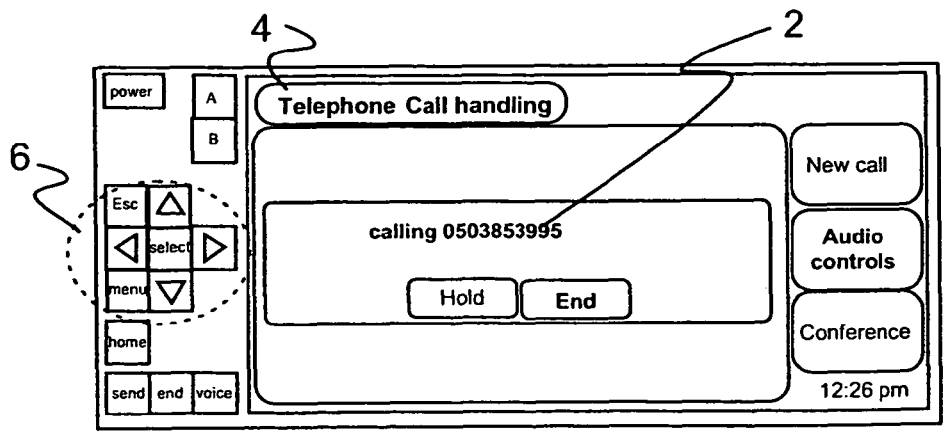
FIG. 3 shows an embodiment of a telephone number application when a call to the found telephone number is set up.

In the example illustrated in FIGS. 1 to 3, the text 1 containing the telephone number 2 is transferred from a calendar 3 by means of the cut and paste technique via the clipboard to the telephone number application 4. The first application can also be some other application than the calendar 3 shown in FIG. 1, for example a notebook, a text processing application, or a browser, and the data content to be processed can be for example a document, a text message or an e-mail message.

Figure 4:
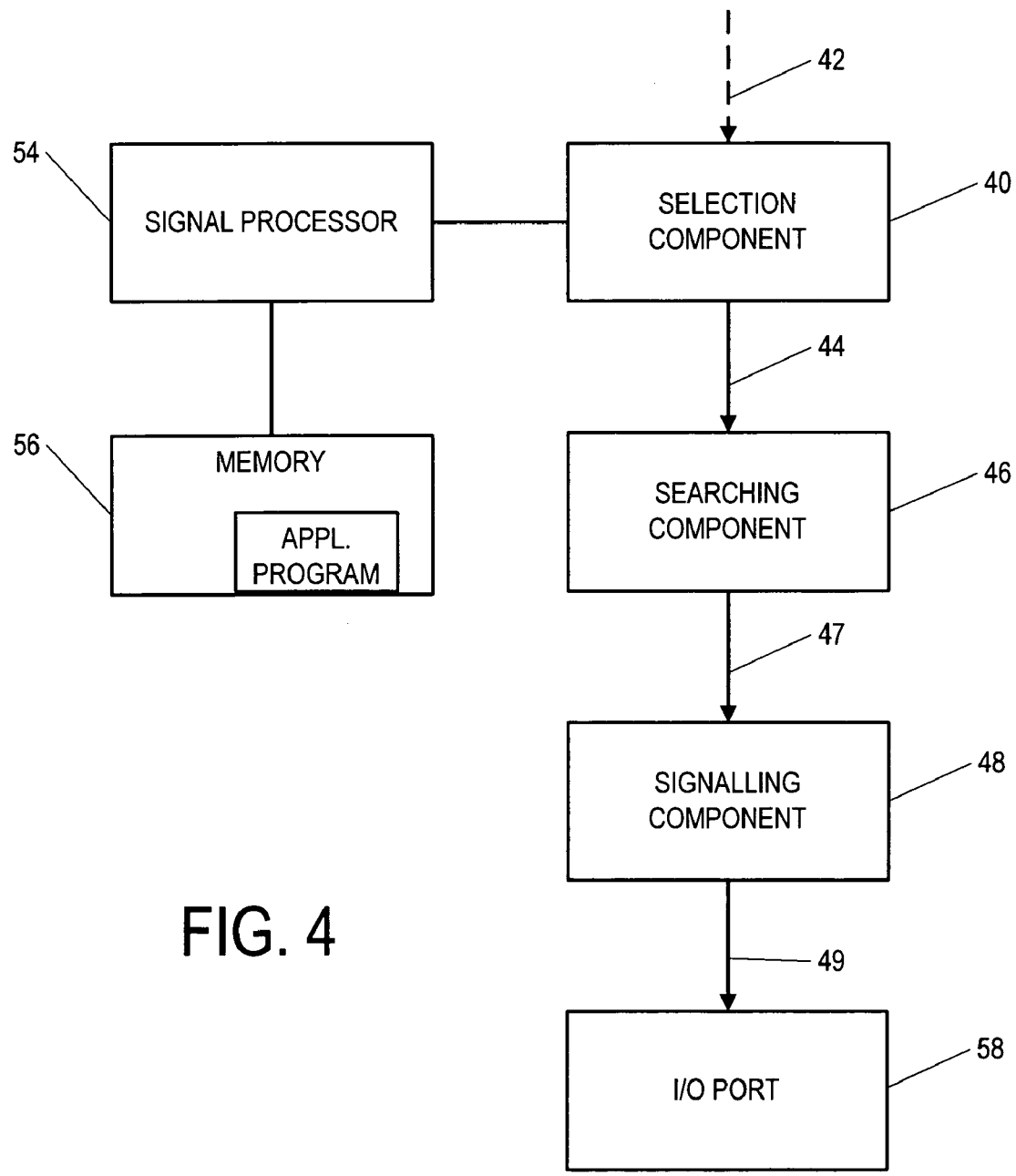
FIG. 4 shows components of a device in combination, according to the invention.

FIG. 1 shows a view of the calendar application 3 shown on the display of a graphic user interface of the device, in which the calendar data includes for example a telephone number 050-385 3995 and a name Tauno Ikunen. In FIG. 1 the shadowing shows the text 1 selected by means of highlighting (Tauno Ikunen 050-385 3995). The selection can be conducted with a control means 6 of the graphic user interface, such as navigation keys, a touch screen, a mouse or a control stick. The selection of the text is advantageously conducted by means of so-called highlighting. For the user it is advantageous to perform the selection in one area that comprises all the desired information. In some embodiments it is, however, possible to select several areas for which the scanning is performed. Of course the selection component used to select the text can take many different forms as suggested above and will also be coupled with a signal processor 54, as shown in FIG. 4, within the device that will be responsive to the selection input of the user. Such a signal processor 54 will normally take either the form of software, hardware or some combination thereof. As shown in FIG. 4, also connected to the signal processor 54 will be a memory device 56, an application program stored therein for execution on the processor 54 and there are data control and address busses interconnecting these components within the device. An input-output port 58 will also be normally provided to allow the device to communicate with the outside world with wired or wireless connections. Referring again to FIG. 1, one type of application which can be stored within the memory of the device is a telephone number application 4 which is associated with or attached to the device in some fashion.

The selected text 1 is transferred to the telephone number application 4 to which it is attached or with which it is associated. FIG. 2 shows a view of an embodiment of the telephone number application 4, to which the text 1 selected earlier in the calendar application 3 is attached. At this stage of the telephone number application 4 the text 1 is shown in the form in which it is selected. The telephone number application 4 scans through the content of the text 1 to search for the telephone number 2 after the application is given a control command for further action, such as a command given with a call key 7 to set up a call. Thus, the telephone number application 4 scans the text 1 for the telephone number 2, and when it finds the number it places a call thereto, as shown in FIG. 3. In a preferred embodiment the control command can be formed automatically in such a manner that when the text 1 has been entered in the field 5, the scanning starts without a separate control command given by the user. In the embodiment according to the example the display thus shows the "actual" telephone number 2, such as the number 0503853995 shown in the Figure, without any additional characters. Thus, a searching component is provided which is responsive to a signal containing the selected text 1 that has been transferred to the telephone number application 4 for providing the result of the search as an output. The searching component can be responsive to the control command mentioned above or some other command signal that has the purpose of starting the searching component. The searching component is also connected to the signal processor mentioned above or its functions are carried out by the signal processor. All of these details for carrying out the invention will be evident to anyone of skill in the art.

If the telephone number 2 cannot be found in the text 1 to be scanned, this is reported to the user, as well as such a situation where several telephone numbers 2 or possible telephone numbers are found. In an embodiment of the invention the text 1 is scanned in such a manner that the characters among the number sequence that for instance improve the readability of the number do not affect the generation of the telephone number 2. Such characters that improve the readability include for example spaces, parenthesis, as well as certain special characters.

According to an embodiment of the invention it is also possible for the user to modify the text attached in the view of the telephone number application 4. The user can for example remove incorrect or irrelevant sections from the text or add sections that are necessary. In an embodiment of the invention it is also possible to enter a text 1 containing the telephone number directly in the field 5 for example by means of a keyboard. Said text 1 is scanned for the telephone number 2 in the above-described manner, wherein for example the typing errors that have occurred at the feeding stage are advantageously corrected.

The found telephone number 2 can be used in several different ways. In an embodiment of the invention a telephone connection is set up to said telephone number 2, and in a second embodiment a message (sound message, text message, image message, multimedia message and/or telecopy message) is transmitted to the address indicated by the telephone number. In the second embodiment the found telephone number 2 is stored in a database advantageously with other identification information. In the example of FIG. 2 there is an "Add to contacts" key for the storing. In an embodiment of the invention the identification data, such as for example a name is composed automatically of the information contained in the scanned text. It will thus be realized that a signalling component is also provided within the device and is responsive to the output signal from the above-mentioned searching component in order to carry out a signalling function such as also described immediately above. Other examples follow.

In an embodiment, in turn, the text located close to the numerical data is identified, and this data is utilized when determining the more specific type of the telephone number 2 (and the terminal relating thereto), such as for example whether the number in question is a telephone number, a telecopy number or a mobile telephone number. In different kinds of texts it is common that there is a text such as for example tel., fax, telefax, mobile phone, GSM, direct, etc. located close to the telephone number, on the basis of which text it is possible to determine the nature of the terminal connected to the number. On the basis of said data relating to the terminal it is possible to use the correct kind of telephone number 2 for the message to be transmitted. Advantageously, the telephone number 2 of correct kind is selected automatically.

The example disclosed only the call set-up between the user and another user. It is possible to apply an embodiment of the invention to set up a so-called group call. Thus, a so-called conference call is set up to the telephone numbers 2 scanned out of the text, or another kind of group message (for example a telecopy or text message) can be transmitted. In a preferred embodiment the telephone numbers 2 are first shown to the user that acknowledges and/or rejects the desired numbers before setting up the call. It is also possible to store the information on said group as individual objects or as a single group.

The modes of operation and structures presented in connection with the above-presented various embodiments can be implemented in several ways. Advantageously, the processing of the text 1 and the telephone number 2 is implemented by means of a program and said program is advantageously stored and executed in a terminal.

FIG. 4 shows in simplified fashion functional blocks of a device according to the present invention that comprises at least means for generating a telephone number and a display such as shown in FIG. 1 for presenting at least a first character string. The device further comprises at least a selection component or means 40 responsive to a input signal 42 for selecting a second character string containing at least one telephone number from the first character string presented on the display of FIG. 1, for instance. The input on the line 42 can be a mechanical input from a keystroke press from the user, e.g., depressing one of the keys 6 shown in FIG. 1. As explained previously, other forms of selection components may be used and therefore the input can be different from that just described. The selection component 40 provides an output signal on a line 44 which is provided to a searching component 46 which includes means for searching for a telephone number from the second character string. Once this searching component 46 determines the telephone number from the second character string it provides a signal indication thereof on a line 47 to a signalling component 48 which includes means for signalling the searched telephone number for any of a wide plurality of possible purposes on a signal line 49.

The device of FIG. 4 may include a first application for presenting the first character string and for determining the second character string as well as a second application for searching for a telephone number from the second character string. In such a device, the functions shown separately in FIG. 4 may be combined in a single application and may also include means for presenting the first character string on the display of FIG. 1. The searching component 46 may also search for information on the type of the terminal of the searched telephone number from the character string. This information may be located in the second character string in the vicinity of the telephone number, for instance.

The searching component 46 may also have the capability of searching for at least two telephone numbers from the second character string and the signalling component would then be set up to signal the at least two telephone numbers. This signalling could be done simultaneously. Of the two telephone numbers, at least one of them searched for.

The signalling component 48 may include means for signalling the telephone number to use one of the following connection forms: an audio call, a telecopy, a text message, a sound message, an image message, a multimedia message, or any of a wide variety of other types of messages. Of course, the device of FIG. 4 includes means for storing the information containing the telephone number in the device. All of the functional descriptions of the components contained in the device of FIG. 4 can be embodied in a computer program which would typically take the form of software, hardware, or some combination thereof. Anyone of skill in the art would be able to carry out the present invention in such a computer program and make a software product that comprises at least such a computer program for generating a telephone number from a character string presented on a display.

By combining, in various ways, the modes and structures presented in connection with the different embodiments of the invention presented above, it is possible to produce various embodiments of the invention in accordance with the spirit of the invention. Therefore, the above-presented examples must not be interpreted as restrictive to the invention, but the embodiments of the invention can be freely varied within the scope of the inventive features presented in the claims hereinbelow.

The invention claimed is:

1. A method comprising:

executing in a selection processor of a device a selection component that selects a second character string comprising a telephone number from a first character string presented on a display of a device, executing in a searching processor of the device a searching component that searches for the telephone number from the second character string, and further searches for a third character string in the vicinity of the telephone number, wherein said third character string comprises information on a type of a terminal connected to the telephone number, and executing in a signalling processor of the device a signalling component to initiate signaling with the telephone number by taking into account the information on the type of the terminal connected to the telephone number.

2. The method according to claim 1, wherein at least two telephone numbers are searched for from the second character string and at least two telephone numbers are signalled, at least one of them being the one searched for.

3. The method according to claim 1, wherein the telephone number is signalled to use one of the following connection forms: an audio call, a telecopy, a text message, a sound message, an image message, and a multimedia message.

4. The method according to claim 1, wherein the information comprising the telephone number is stored in the device.

5. A device comprising:

a selection processor configured to select a second character string comprising a telephone number from a first character string presented on a display of a device, a searching processor configured to search for the telephone number from the second character string and a third character string from the second character string in the vicinity of the telephone number, wherein said third character string comprises information on a type of a terminal connected to the telephone number, and a signalling processor configured to initiate signalling with the telephone number by taking into account the information on the type of the terminal connected to the telephone number.

6. The device according to claim 5, wherein the device also comprises a first application configured to present the first character string and to determine the second character string, and a second application configured to search for the telephone number from the second character string.

7. The device according to claim 5, wherein the searching processor is also configured to search for at least two telephone numbers from the second character string, and the signalling processor is also configured to signal at least two telephone numbers substantially simultaneously, of which telephone numbers at least one is the one searched for.

8. The device according to claim 5, wherein the signalling processor is configured to signal the telephone number to use one of the following connection forms: an audio call, a telecopy, a text message, a sound message, an image message, and a multimedia message.

9. The device according to claim 5, wherein a storing processor of the device is configured to store the information comprising the telephone number in the device.

10. The device according to claim 5, wherein the device is one of the following: a telecommunication device, a mobile station, a PDA, and a computer.

11. A computer program product comprising a computer readable storage structure embodying computer program code thereon for execution by a computer processor, wherein said computer program code comprises instructions for execution by said processor for executing in a selection processor of a device a selection component that selects a second character string comprising a telephone number from a first character string presented on a display of a device, for executing in a searching processor of the device a searching component that searches for the telephone number from the second character string, and further searches for a third character string in the vicinity of the telephone number, wherein said third character string comprises information on a type of a terminal connected to the telephone number, and for executing in a signalling processor of the device a signalling component to initiate signaling with the telephone number by taking into account the information on the type of the terminal connected to the telephone number.

12. The method according to claim 1, wherein one processor is the selection processor, searching processor, and signalling processor.

13. The device according to claim 1, wherein one processor is the selection processor, searching processor, signalling processor, and storing processor.

* * * * *